3,186,968
POLYMERIC COMPOSITIONS RESISTANT TO ULTRA-VIOLET LIGHT FROM ACRYLYLOXY-METHYL BENZOATES
Joseph Fertig and Martin Skoultchi, New York, N.Y., and Albert I. Goldberg, Berkeley Heights, N.J., assignors to National Starch and Chemical Corporation, New York, N.Y., a corporation of Delaware
No Drawing. Filed Nov. 6, 1961, Ser. No. 150,197
5 Claims. (Cl. 260—47)

This invention relates to polymeric compositions and to the process for their preparation, and more particularly to polymers and copolymers displaying unusual resistance to the degradative effects of ultra-violet radiation.

It is the prime object of this invention to provide polymeric compositions derived from monomeric materials whose presence imparts vastly improved light stability to the resulting polymers. An additional object of this invention involves the preparation of polymers which withstand the effects of ultra-violet light without the necessity of their being formulated with any extraneous ultra-violet light absorbers.

The incorporation of ultra-violet light absorbers in the synthetic plastics derived from high polymers is, of course a practice well known to those skilled in the art. Such ultra-violet absorbers are required since outdoor exposure to natural sunlight or continuous indoor exposure to fluorescent light tends to degrade most plastics and this photodegradation of plastics is, in turn, known to be caused by the ultra-violet portion of light. Such degradation is observable in a plastic as a result of a change in color, such as a yellowing or darkening, and/or by a deterioration of its physical properties, such as its flexural strength. In an attempt to overcome these deleterious effects of ultra-violet radiation, the addition of ultra-violet absorbers or stabilizers, such as the phenyl salicylates or the ortho-hydroxy benzophenones, has of late become of considerable commercial interest. In order to be effective, such materials should be able to absorb strongly in the ultra-violet range of from 300–400 millimicrons without undergoing any change in structure. In addition, they must possess many other properties such as low color, good compatibility, heat stability, low odor, low volatility, chemical stability and chemical inertness. Furthermore, a complete lack of toxicity as well as the total absence of any migration from the formulated polymer are two important prerequisites of any ultra-violet stabilizers which are to be used in plastics or coatings which are to be employed as wrappers or containers for food products.

The phenyl ortho-hydroxy benzoate esters, such as phenyl salicylate, have many advantages as ultra-violet absorbers. They are colorless, relatively inexpensive and moderately effective, particularly in the range of about 350 millimicrons or higher. However, their compatibility varies depending upon the specific benzoate ester and the plastic with which they are used. Thus, they may be somewhat volatile, impart odor and, under certain conditions they may give rise to the problems of toxicity and migration.

In our copending application, Serial No. 150,154, filed November 6, 1961, and assigned to the assignee of the present application, there is disclosed a novel class of vinyl type monomers comprising ethylenically unsaturated derivatives of phenyl ortho-hydroxy benzoate esters. We have now discovered that a wide variety of polymers are copolymers which are derived from these novel monomers are found to be effectively stabilized against ultra-violet radiation without requiring the addition to said polymers of any extraneous ultraviolet light absorbers. The novel polymeric compositions of our invention are thus found to possess all of the many advantages, and particularly the improved light stability, which results from the utilization of extraneous ultra-violet light absorbers while managing to avoid all of the problems which are normally associated with their use. This improved light stability is imparted to these polymers as a result of the presence therein of the phenyl ortho-hydroxy benzoate moiety which is permanently bound into and inherently part of the resulting polymer molecules as a result of the incorporation therein of these ethylenically unsaturated phenyl orthohydroxy benzoate monomers.

The products of our invention may thus be said to comprise those homo- and copolymers containing at least one ethylenically unsaturated phenyl or substituted phenyl salicylate derivative corresponding to the formula:

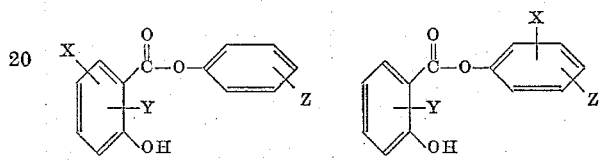

wherein X represents an ethylenically unsaturated group selected from the class consisting of acrylyloxy, acrylyloxyalkyl, methacrylyloxy, and methacrylyloxyalkyl groups and Y and Z represents at least one member of the class consisting of hydrogen, alkyl, aryl, acyloxy, aralkyl, or halogen radicals.

As representative of the above described monomers containing the phenyl salicylate moiety, one may list phenyl 2-hydroxy-4-acrylyloxy benzoate; phenyl 2-hydroxy-5-acrylyloxy benzoate; phenyl 2-hydroxy-5-acrylyloxymethyl benzoate; phenyl 2-hydroxy-4-methacrylyloxy benzoate; phenyl 2-hydroxy-5-methacrylyloxy benzoate; and, phenyl 2-hydroxy-5-methacrylyloxymethyl benzoate. Thus it is to be seen that the monomers which are essential for the preparation of the polymeric compositions of our invention may be described as the acrylyloxy, methacrylyloxy, acrylyloxyalkyl and methacrylyloxyalkyl derivatives of phenyl salicylate. Each of the above listed monomeric derivatives may, in turn, contain a variety of other substituent groups including halogen, alkyl, aryl, acyloxy, and aralkyl groups wherein these latter groups may be substituted on either of the phenyl rings in the phenyl salicylate moiety.

The comonomers which may be utilized together with the above described ethylenically unsaturated phenyl salicylate derivatives for the preparation of the ultraviolet stable compositions of our invention can be any ethylenically unsaturated monomer such, for example, as styrene; methyl styrene; the acrylic and methacrylic acid esters of aliphatic alcohols such as methyl, ethyl, propyl, butyl, isobutyl, hexyl, 2-ethyl hexyl, octyl, lauryl and stearyl alcohols; acrylic acid; methacrylic acid; acrylamide; acrylonitrile; methacrylonitrile; vinylidene chloride; vinyl chloride, vinyl acetate; ethylene; and propylene, etc. Any of these monomers may be used either alone or in combination with one another together with one or more of the phenyl salicylate containing monomers. In order to effectively withstand the effects of ultra-violet radiation, the copolymers of our invention should contain at least 0.2%, by weight, of these ethylenically unsaturated phenyl salicylate derivatives. As for the maximum concentration, this will of course depend upon the particular comonomer as well as on the specific end use application of the resulting copolymer. However, in most cases a concentration of about 5.0%, by weight, will be fully adequate with optimum results being obtained with a concentration in the range of about 2.0%.

As for the actual preparation of the homo- and copolymers of our invention, there may be employed any of the usual vinyl polymerization methods which are well known to those skilled in the art. Thus, they may be prepared by means of free radical initiated processes utilizing bulk, suspension, solution, or emulsion polymerization techniques; or, they may be prepared by ionic catalysis or by means of stereospecific catalysts such as those of the type developed by Ziegler.

In any event, the homo- and copolymers of our invention, whether prepared by means of bulk, suspension, solution, or emulsion polymerization technique or by other means, are all characterized by their improved stability to light. This improved stability is fully equivalent, and in many cases superior, to the results obtained when extraneous ultra-violet light absorbers are added to the comparable polymers which do not contain these phenyl salicylate derivatives. Moreover, all of the previously described deficiencies which are inherent in the use of these extraneous stabilizers are completely avoided with the products of our invention. Thus, our novel polymeric compositions offer protection against the degradative effects of ultra-violet radiation while eliminating problems of volatility, odor, toxicity or migration.

Our homogeneously prepared polymeric compositions can be used in any form without encountering any of the problems which may arise when it is necessary to incorporate a solid stabilizer into a polymeric material. This is especially important in those applications which require a dry product such as with molding powders wherein the uniform incorporation of an external stabilizer would require considerable heating and/or mechanical agitation. It is also advantageous in latices or emulsions wherein the incorporation of dry powders can often be troublesome or economically unfeasible. This is particularly evident in the case of polyvinylidene chloride or polyacrylonitrile latices where, with few exceptions, the polymers are incompatible with additives. Synthetic rubber, and other latices where the resulting polymer is cross-linked, are further illustrations of systems in which it is difficult to provide for the effective post-addition of ultra-violet stabilizers especially where the final product is used in the form of a latex.

There are several different techniques by which the homo- and copolymers of our invention may be utilized. Thus, where possible, they may be directly fabricated into such forms as coatings, films, sheeting and other solid shapes which may then be further fabricated into various industrial and consumer products. On the other hand, our products may also be physically blended with a wide variety of polymers and these blends may then be used as desired. Another approach involves the application or lamination of free films of our compositions to various polymeric substrates, these films thereby serving to protect said substrates from the effects of ultra-violet radiation. For example, films derived from copolymers of our phenyl salicylate monomers with acrylate or methacrylate esters may be applied over cellulosic plastics or over surface coatings such as spar varnishes so as to enhance their aging properties. Or, alternatively, such copolymers may, if compatible, be directly blended with the cellulosics or spar varnishes and thereby impart the advantages of the compositions of our invention to these materials.

Illustrative of some widely used plastics which require the use of ultra-violet stabilizers are polyesters, polystyrene, polyvinyl chloride, polyethylene and polyvinylidene chloride. Polyesters, namely, the unsaturated polyesters having ethylenic unsaturation resulting from the presence of alpha, beta-unsaturated carboxylic acids such as maleic and fumaric acid, are typically formulated with monomeric styrene or methyl methacrylate and, in conjunction with fiber glass reinforcement, are employed in the preparation of corrugated and flat sheeting products. The latter are used as roofings, awnings, walk coverings, glazing for windows, skylights, etc. Another large volume outlet for polyester resins is in the construction of plastic boats. Most of these applications require outdoor exposure durability. However, unless they are stabilized, the polyester resins tend to yellow and physically deteriorate. In overcoming this poor stability on the part of the polyester resins, the practitioner need merely introduce one of the above described phenyl salicylate monomers together with the styrene or methyl methacrylate monomer, the polymerization catalyst and the unsaturated polyester. The resulting copolymerization reaction will thus result in the homogeneous, chemically bonded incorporation of the ultra-violet absorbing moiety. For optimum results in these polyester resin systems, the use of the methacrylyloxy and methacrylyloxyalkyl phenyl salicylate derivatives is recommended.

Similarly, polystyrene has been recommended as a plastic for automobile reflector lights and indoor light diffusing louvers. However, polystyrene on exposure to either natural or fluorescent light tends to discolor and crack within a short period of time. By copolymerizing styrene, preferably with a methacrylyloxy phenyl salicylate derivative, the resulting homogeneous copolymer is found to be remarkably resistant to both natural and fluorescent light.

Polyvinyl chloride and vinyl chloride copolymer film formulations tend to discolor and become embrittled when exposed to light for prolonged periods of time. Here again, the homogeneous copolymers prepared by incorporating a small amount of an acrylyloxy or acrylyloxyalkyl phenyl salicylate derivative tend to minimize the undesirable properties of these polymers. These same improvements are also obtained when polyethylene copolymers are prepared according to the process of our invention. Ordinarily, polyethylene is very unstable to sunlight, becoming embrittled in a matter of months.

The following examples will more clearly illustrate the embodiment of our invention. In these examples, all parts given are by weight unless otherwise noted.

*Example I*

This example illustrates the preparation of one of the novel copolymers of our invention and also demonstrates its improved resistance to the degradative effects of ultra-violet radiation.

An aqueous latex of a 90:8:2 vinylidene chloride: ethyl acrylate:phenyl 2-hydroxy-5-acrylyloxymethyl benzoate terpolymer was prepared by charging the following ingredients into a reactor equipped with a reflux condenser as well as with means for mechanical agitation.

| | Parts |
|---|---|
| Vinylidene chloride | 90 |
| Ethyl acrylate | 8 |
| Phenyl 2-hydroxy-5-acrylyloxymethyl benzoate | 2 |
| Sodium lauryl sulfate | 1.5 |
| Sodium dioctyl sulfosuccinate | 0.75 |
| Sodium dodecyl benzene sulfonate | 0.75 |
| Sodium bicarbonate | 0.3 |
| Sodium bisulfite | 0.2 |
| Ammonium persulfate | 0.25 |
| Water | 100 |

Under agitation, the above mixture was then refluxed at 33–55° C. for a period of 5 hours thereby resulting in a latex with a resin solids content of 50%, by weight, which had an intrinsic viscosity of 0.9, as measured in tetrahydrofuran at a temperature of 22° C.

This latex was then used in the preparation of 1.5 mil (dry thickness) coatings which were cast upon sheets of white paper. Various samples of these coated sheets were then exposed to the following lights sources: (A) At a distance of 6″ to a 15 watt ultra-violet germicidal lamp having a radiation range of 220–400 millimicrons; (B) at a distance of 3″ to four 20 watt fluorescent bulbs which were enclosed, together with the test sheets, within a sealed box; (C) to sunlight. As controls for these tests, similarly coated sheets were exposed under the identical conditions; however the coatings of these control sheets were derived, in one case, from a 90:10 vinylidene chloride:ethyl acrylate copolymer latex which had been polymerized in the presence of 2% of phenyl salicylate, as based upon the total weight of the monomers. The coatings of the second set of control sheets were derived from a 90:10 vinylidene chloride:ethyl acrylate copolymer latex.

The effect of the various light sources upon these resin films was determined, with respect to any color change which had occurred, by utilizing a Photovolt Reflectometer, Model No. 610; a device which records proportionately higher readings with the increased yellowing of the particular coatings being evaluated. The following table presents the results of these tests.

| Coating resin | Reflectometer readings | | |
|---|---|---|---|
| | Germicidal lamp (24 hr. exposure) | Fluorescent lamp (120 hr. exposure) | Sunlight (12 hr. exposure) |
| Terpolymer contg. the U-V stabilizing moiety | 25 | 3 | 6 |
| Control comprising vinylidene chloride: ethyl acrylate copolymer polymerized in the presence of phenyl salicylate | 24 | 14 | 16.5 |
| Control comprising vinylidene chloride:ethyl acrylate copolymer | 40.5 | 15 | 21.5 |

The above data indicates that the polymers of our invention are far superior in their resistance to the effects of ultra-violet radiation than comparable polymers which do not contain the ultra-violet absorbing moiety. Moreover, these results show that our polymers are equivalent in their stability, and in some cases (e.g., exposure to sunlight), they are as far superior to polymers containing admixed ultra-violet stabilizers such as phenyl salicylate.

*Example II*

This example illustrates the preparation of one of the novel copolymers of our invention and also demonstrates its improved resistance to the degradative effects of ultra-violet radiation.

An aqueous latex of a 90:8:2 vinylidene chloride:ethyl acrylate:phenyl 2-hydroxy-4-acryloxy benzoat terpolymer was prepared using the same ingredients and by means of the same procedure used for the preparation of the terpolymer latex of Example I with the exception, in this instance, that phenyl 2-hydroxy-4-acryloxy benzoate was used as the ultra-violet absorbing monomer. The resulting latex had a resin solids content of 50%, by weight, and an intrinsic viscosity of 0.8, when measured in tetrahydrofuran at 22° C.

Coatings derived from this latex were then tested as described in Example I and the results of these tests are presented in the following table.

| Coating resin | Reflectometer readings | | | |
|---|---|---|---|---|
| | Germicidal lamp (1 hour exposure) | Fluorescent lamp (72 hour exposure) | Sunlight | |
| | | | (48 hr. exp.) | (12 hr. exp.) |
| Terpolymer contg. the U-V stabilizing moiety | 1.5 | 4.5 | 2.5 | 1 |
| Control comprising a vinylidene chloride: ethyl acrylate copolymer | 25 | 10 | 9 | 5 |

The above results again clearly indicate the superior ultra-violet stability of our polymers as compared with comparable polymers which do not contain the ultra-violet absorbing moiety.

*Example III*

This example illustrates the preparation of one of the novel copolymers of our invention and also demonstrates its improved resistance to the degradative effects of ultra-violet radiation.

An aqueous latex of a 74:24:2 vinylidene chloride:butyl acrylate:phenyl 2-hydroxy-5-acrylyloxymethyl benzoate terpolymer was prepared by charging the following ingredients into a reactor equipped with a reflux condenser and means for mechanical agitation.

| | Parts |
|---|---|
| Vinylidene chloride | 74 |
| Butyl acrylate | 24 |
| Phenyl 2-hydroxy-5-acrylyloxymethyl benzoate | 2 |
| Sodium tridecyl ether | 3 |
| Sodium dodecyl benzene sulfonate | 6 |
| Ammonium persulfate | 0.25 |
| Sodium bisulfite | 0.5 |
| Water | 110 |

Under agitation, the above mixture was refluxed at 40–60° C. for a period of 3 hours thereby resulting in a latex with a resin solids content of 44%, by weight, which had an intrinsic viscosity of 0.4, as measured in tetrahydrofuran at 22° C.

This latex was then used in the preparation of 1.5 mil (dry thickness) coatings which were cast upon sheets of white paper. Samples of these coated sheets were then exposed for 24 hours to the ultra-violet germicidal lamp. The controls for this test comprised sheets which had been coated with a 74:26 vinylidene chloride:butyl acrylate copolymer latex. The effects of this exposure to an ultra-violet source were evaluated with a Photovolt Reflectometer and the following table presents the results of these tests.

REFLECTOMETER READINGS

Coating resin:  Germicidal lamp (24 hour exposure at 6")
  Terpolymer contg. the ultra-violet stabilizing moiety _____ 17.5
  Control comprising a vinylidene chloride:butyl acrylate copolymer _____ 37

The above results again clearly indicate the superior ultra-violet stability of our polymers as compared with comparable polymers which do not contain the ultra-violet absorbing moiety.

*Example IV*

This example illustrates the preparation of one of the novel copolymers of our invention and also demonstrates its improved resistance to the degradative effects of ultra-violet radiation.

An aqueous latex of a 69:29:2 vinyl chloride:octyl acrylate:phenyl 2-hydroxy-5-acrylyloxymethyl benzoate terpolymer was prepared by charging the following ingredients into a pressurized reactor.

| | Parts |
|---|---|
| Vinyl chloride | 69 |
| Octyl acrylate | 29 |
| Phenyl 2-hydroxy-5-acrylyloxymethyl benzoate | 2 |
| Octyl phenoxy polyoxyethylene ethanol | 7.5 |
| Sodium lauryl sulfate | 2 |
| Ammonium persulfate | 0.4 |
| Water | 168 |

The above mixture was then maintained at a temperature of 70° C. for a period of 8 hours resulting in a latex with a resin solids content of 39.5%, by weight, which had an intrinsic viscosity of 0.5, as measured in tetrahydrofuran at 22° C.

This latex was then used in the preparation of 1.5 mil (dry thickness) coatings which were cast upon sheets of white paper. Samples of these coated sheets were then exposed for 28 days to the ultra-violet germicidal lamp. The controls for this test comprised sheets which had been coated with a 70:30 vinyl chloride:octyl acrylate copolymer latex. The effects of this exposure to an ultraviolet source were evaluated with a Photovolt Reflectometer and the following table presents the results of these tests.

REFLECTOMETER READINGS

Coating resin:  Germicidal lamp (28 day exposure at 6″)
Terpolymer contg. the ultra-violet stabilizing moiety _____ 13.5
Control comprising vinylidene chloride:octyl acrylate copolymer _____ 27.5

The above results again clearly indicate the superior ultra-violet stability of our polymers as compared with comparable polymers which do not contain the ultra-violet absorbing moiety.

*Example V*

This example illustrates the preparation of one of the novel copolymers of our invention and also demonstrates its improved resistance to the degradative effects of ultra-violet radiation.

An aqueous latex of a 68:28:4 vinyl chloride:octyl acrylate:phenyl 2-hydroxy-5-acrylyloxymethyl benzoate terpolymer was prepared using the same ingredients and by means of the same procedure as were used for the preparation of the terpolymer of Example IV with the exception, in this case, that 4 rather than 2 parts of phenyl 2-hydroxy-5-acrylyloxymethyl benzoate were used. The resulting latex had a resin solids content of 39.0%, by weight, and an intrinsic viscosity of 0.35, as measured in tetrahydrofuran at 22° C.

This latex was then used in the preparation of 1.5 mil (dry thickness) coatings which were cast upon sheets of white paper. Samples of these coated sheets were then exposed for 28 days to the ultra-violet germicidal lamp. The controls for this test comprised sheets which had been coated with a 70:30 vinyl chloride:octyl acrylate copolymer latex. The effects of this exposure to an ultra-violet source were evaluated with a Photovolt Reflectometer and the following table presents the results of these tests.

REFLECTOMETER READINGS

Coating resin:  Germicidal lamp (28 day exposure at 6″)
Terpolymer contg. the ultra-violet stabilizing moiety _____ 10
Control comprising a vinyl chloride:octyl acrylate copolymer _____ 27.5

The above results again clearly indicate the superior ultra-violet stability of our polymers as compared with comparable polymers which do not contain the ultra-violet absorbing moiety.

*Example VI*

This example illustrates the preparation of one of the novel copolymers of our invention and also demonstrates its improved resistance to the degradative effects of ultra-violet radiation.

An ethyl acetate lacquer of a 97:2 ethyl acrylate:phenyl 2-hydroxy-5-methacrylyloxymethyl benzoate copolymer was prepared by charging the following ingredients into a reactor equipped with a reflux condenser and means for mechanical agitation.

|  | Parts |
|---|---|
| Ethyl acrylate | 97 |
| Phenyl 2-hydroxy-5-methacrylyloxymethyl benzoate | 3 |
| Ethyl acetate | 300 |
| Benzoyl peroxide | 1 |

Under agitation, the above mixture was then refluxed for 7 hours at a temperature of 78° C. thereby resulting in a lacquer having a resin solids contents of 24%, by weight, and an intrinsic viscosity of 0.55, as measured in acetone at 22° C.

This lacquer was then used in the preparation of 1.5 mil (dry thickness) coatings which were cast upon glass plates. Samples of these coated plates were then exposed for 17 hours to the ultra-violet germicidal lamp. The controls for this test comprised glass plates which had been coated with an ethyl acrylate homopolymer lacquer. The effects of this exposure to an ultra-violet source were evaluated by measuring the change in the intrinsic viscosity of the exposed polymer. The extent of the change in the intrinsic viscosity of the polymer is in direct relationship to the degradation resulting from the effects of its exposure to the ultra-violet light. The results of this test are presented in the following table.

| Coating resin | Intrinsic viscosity | |
|---|---|---|
|  | Before exposure | After exposure |
| Copolymer contg. the ultra-violet stabilizing moiety | 0.69 | 0.69 |
| Control comprising an ethyl acrylate homopolymer | 0.56 | 0.40 |

The above results again clearly indicate the superior ultra-violet stability of our polymers as compared with comparable polymers which do not contain the ultra-violet absorbing moiety.

*Example VII*

This example illustrates the preparation of one of the novel homopolymers of our invention and also demonstrates its use as a protective coating for an ultra-violet sensitive polymer. Evidence of the prolonged stability of this homopolymer to ultra-violet radiation is also given.

An ethyl acetate lacquer of polyphenyl 2-hydroxy-5-acrylyloxymethyl benzoate was prepared by charging the following ingredients into a reactor equipped with a reflux condenser and means for mechanical agitation.

|  | Parts |
|---|---|
| Phenyl 2-hydroxy-5-acrylyloxymethyl benzoate | 20 |
| Ethyl acetate | 80 |
| Benzoyl peroxide | 0.2 |

Under agitation, the above mixture was then refluxed at 78° C. for a period of one hour, thereby resulting in a lacquer with a resin solids content of 20%, by weight, which had an intrinsic viscosity of 0.2, as measured in acetone, at 22° C.

This lacquer was then used in the preparation of 0.3 mil (dry thickness) coatings which were cast upon sheets of white paper which had been previously coated with a 1.5 mil film of polyvinylidene chloride. Various samples of these sheets were then exposed, at a distance of 6″, to the 15 watt ultra-violet germicidal lamp. The controls for this test consisted of comparable polyvinylidene chloride coated sheets of white paper which did not have the additional coating of the homopolymer of our invention. The effects of this exposure to the ultra-violet source were evaluated with a Photovolt Reflectometer and the following table presents the results of these tests.

REFLECTOMETER READINGS

Coating resin:  Germicidal lamp (1 hr. exposure at 6″)
Ultra-violet stabilizing homopolymer of our invention coated over a polyvinylidene chloride coating _____ 7
Unprotected control comprising the polyvinylidene chloride coating _____ 41

In order to illustrate the prolonged ultra-violet stability of this homopolymer, the above described lacquer was used to apply 0.3 mil (dry thickness) coatings upon sheets of white paper. Samples of these coated sheets were then exposed, for 24 hours, at a distance of 6″ from the germicidal lamp. Upon being tested with a Photovolt Reflectometer, these homopolymer films gave no evidence of any color change.

*Example VIII*

This example illustrates the preparation of one of the novel copolymers of our invention and also demonstrates its use as a protective coating for an ultra-violet sensitive polymer.

An ethyl acetate lacquer of a 74:26 phenyl 2-hydroxy-5-acrylyloxy benzoate:methyl acrylate copolymer was prepared by charging the following ingredients into a reactor equipped with a reflux condenser and means for mechanical agitation.

| | Parts |
|---|---|
| Methyl acrylate | 26 |
| Phenyl 2-hydroxy-5-acrylyloxy benzoate | 9 |
| Ethyl acetate | 65 |
| Benzoyl peroxide | 0.1 |

Under agitation, the above mixture was then refluxed at 78° C. for a period of 6 hours, thereby resulting in a lacquer with a resin solids content of 34%, by weight, which had an intrinsic viscosity of 0.3, as measured in acetone at 22° C.

This lacquer was then used in the preparation of 0.3 mil (dry thickness) coatings which were cast upon sheets of white paper which had been previously coated with a 1.5 mil film of polyvinylidene chloride. Various samples of these sheets were then exposed, at a distance of 6″, to the 15 watt ultra-violet germicidal lamp. The controls for this test consisted of comparable polyvinylidene chloride coated sheets of white paper which did not have the additional coating of the homopolymer of our invention. The effects of this exposure to the ultra-violet source were evaluated with a Photovolt Reflectometer and the following table presents the results of these tests.

REFLECTOMETER READINGS

| Coating resin: | Germicidal lamp (1 hr. exposure at 6″) |
|---|---|
| Ultra-violet stabilizing copolymer of our invention coated over a polyvinylidene chloride coating | 10 |
| Unprotected control comprising the polyvinylidene chloride coating | 39 |

The above results again clearly indicate the superior ultra-violet stability of our polymers as compared with comparable polymers which do not contain the ultra-violet absorbing moiety.

Summarizing, our invention is thus seen to provide a novel class of polymers which are characterized by their outstanding resistance to the normally degradative effects of ultra-violet light. Variations may be made in proportions, procedures and materials without departing from the scope of this invention defined by the following claims.

We claim:

1. A composition comprising a polymer of at least one ethylenically unsaturated monomer selected from the group consisting of styrene, methyl styrene, the acrylic and methacrylic acid esters of aliphatic alcohols, acrylic acid, methacrylic acid, acrylamide, acrylonitrile, methacrylonitrile, vinylidene chloride, vinyl chloride, vinyl acetate, ethylene and propylene together with at least one ethylenically unsaturated phenyl salicylate derivative selected from the group consisting of phenyl 2-hydroxy-5-acrylyloxymethyl benzoate and phenyl 2-hydroxy-5-methacrylyloxymethyl benzoate.

2. A copolymer, in accordance with claim 1, of vinylidene chloride, ethyl acrylate and phenyl 2-hydroxy-5-acrylyloxymethyl benzoate.

3. A copolymer, in accordance with claim 1, of vinylidene chloride, butyl acrylate and phenyl 2-hydroxy-5-acrylyloxymethyl benzoate.

4. A copolymer, in accordance with claim 1, of vinyl chloride, octyl acrylate and phenyl 2-hydroxy-5-acrylyloxymethyl benzoate.

5. A coploymer, in accordance with claim 1, of ethyl acrylate and phenyl 2-hydroxy-5-methacrylyloxymethyl benzoate.

References Cited by the Examiner
UNITED STATES PATENTS

| 2,545,044 | 3/51 | Reynolds et al. | 260—474 |
| 2,910,454 | 10/59 | Clark et al. | 260—473 |
| 2,938,883 | 5/60 | Raich | 260—47 |
| 3,113,907 | 12/63 | Tocker | 260—47 |
| 3,141,903 | 7/64 | Fertig | 260—47 |

WILLIAM H. SHORT, *Primary Examiner.*

LOUISE P. QUAST, *Examiner.*